US008922352B2

(12) United States Patent
Tsui et al.

(10) Patent No.: US 8,922,352 B2
(45) Date of Patent: Dec. 30, 2014

(54) REMOTE CONTROL DEVICE WITH PASSWORD FUNCTIONS

(76) Inventors: Philip Y. W. Tsui, Fo Tan (HK); Gallen K. L. Tsui, Brampton (CA)

( * ) Notice: Subject to any disclaimer, the term of this patent is extended or adjusted under 35 U.S.C. 154(b) by 190 days.

(21) Appl. No.: 13/309,953

(22) Filed: Dec. 2, 2011

(65) Prior Publication Data

US 2012/0139698 A1 Jun. 7, 2012

(30) Foreign Application Priority Data

Dec. 2, 2010 (CA) ..................................... 2723647

(51) Int. Cl.

*G05B 11/01* (2006.01)
*G08C 19/16* (2006.01)
*G08C 23/04* (2006.01)
*G08C 17/02* (2006.01)

(52) U.S. Cl.

CPC ................ *G08C 23/04* (2013.01); *G08C 17/02* (2013.01); *G08C 2201/61* (2013.01)
USPC ....................... 340/12.23; 340/5.54; 340/5.85

(58) Field of Classification Search

CPC .......... H04N 21/4532; H04N 21/4751; H04N 21/4753; H04N 7/163; G08C 17/00
USPC .................. 340/12.22–12.29, 4.3, 4.31, 4.37, 340/5.2–5.3, 5.21–5.28, 5.31–5.33, 5.51, 340/5.54, 5.74, 5.85; 341/175–176; 348/734; 725/25, 27–30
See application file for complete search history.

(56) References Cited

U.S. PATENT DOCUMENTS 5,764,281 A * 6/1998 Seo ................................ 348/55
5,964,877 A * 10/1999 Victor et al. .................... 726/18
6,407,779 B1 * 6/2002 Herz ............................ 348/734
6,791,467 B1 * 9/2004 Ben-Ze'ev ................ 340/12.25
7,248,144 B2 7/2007 Rodriguez
7,595,846 B2 * 9/2009 Moon .......................... 348/734
2002/0044226 A1 * 4/2002 Risi .............................. 348/734
2002/0178740 A1 * 12/2002 Sumida et al. .................. 62/157
2003/0234737 A1 * 12/2003 Nelson et al. ................. 341/176
2004/0128681 A1 * 7/2004 Hancock et al. ................ 725/30
2004/0261097 A1 * 12/2004 Hanks ............................ 725/29
2004/0263377 A1 * 12/2004 Risi et al. ...................... 341/175
2005/0125822 A1 * 6/2005 Casement et al. .............. 725/30
2005/0198664 A1 * 9/2005 Cho et al. ........................ 725/38
2006/0048205 A1 * 3/2006 Poslinski ...................... 725/134
2006/0209180 A1 * 9/2006 Jang .......................... 348/14.05
2007/0061587 A1 * 3/2007 Kim ............................. 713/182
2007/0155418 A1 * 7/2007 Shau et al. ................. 455/550.1
2008/0001773 A1 * 1/2008 Rye et al. ................ 340/825.22
2008/0062337 A1 * 3/2008 Maier ........................... 348/734
2008/0163286 A1 * 7/2008 Rudolph et al. ................ 725/28
2008/0234843 A1 * 9/2008 Akaiwa et al. .................. 700/83
2009/0244402 A1 * 10/2009 Rye et al. ...................... 348/734
2010/0007458 A1 * 1/2010 Cannistraro et al. ......... 340/3.71
2010/0328547 A1 * 12/2010 Mayorga ....................... 348/734

* cited by examiner

*Primary Examiner* — Hai Phan
*Assistant Examiner* — Orlando Bousono

(57) ABSTRACT

The invention provides a remote control device with password functions. Control function buttons can be used for sending control signals and for password entry. The remote control device is configured such that a user can enable and disable a password mode. When the password mode is enabled, the remote control is configured to require a password being entered using one or more control function buttons before a control signal will be transmitted in response to a control function being pressed or disabling the password mode. A user can also invoke a password programming function to enter, change or erase a password using one or more control function buttons.

20 Claims, 5 Drawing Sheets

REMOTE CONTROL DEVICE WITH PASSWORD FUNCTIONS

FIELD OF INVENTION

The invention relates generally to the field of control devices. In particular, the invention relates to a remote control device with password functions.

BACKGROUND OF INVENTION

Remote control devices (often simply referred to as remote control) have been widely used nowadays for many applications, from controlling audio video equipment, lighting to access control such as opening and closing a garage door, locking and unlocking a deadbolt lock, even arming and disarming an alarm system. Some of these applications involve security measure. For example, a garage door remote control for opening a garage door, a remote control for unlocking a door, or a remote control for arming and disarming an alarm system. Most of the remote controls can be accessed by any user simply by pressing the designated buttons. Gaining access to such a remote control generally means gaining access to the controlled security device. Therefore, it is desired to have additional security measure to these remote controls so that not everyone having physical access to a remote control device can activate the remote control device or the controlled device.

It is an object of the present invention to mitigate or obviate at least one of the above mentioned disadvantages.

SUMMARY OF INVENTION

The present invention relates generally to a remote control device with built-in password functions. A remote control device generally has different function buttons. These function buttons can be physical buttons, or these may be "virtual" buttons, i.e., as actuatable areas provided on a graphical user interface ("GUI"). These different function buttons can be assigned to different control functions or different devices. In general, a control signal is sent in response to a function button being activated, or pressed. Control signals sent in response to different buttons being actuated can be different. These function buttons can also be used as a password entry input means. When a function button is used for entering password, no control signal is transmitted when entering password. A user first enters a password, which will be verified by the remote control device. If the entered password is incorrect, the remote control device will not transmit any signal. If the entered password is correct, subsequent pressing of a function button will cause a corresponding control signal being transmitted.

In an aspect of the invention, a remote control device is provided. The remote control device includes a plurality of function buttons, a signal transmission circuitry, and a microprocessor operatively connected to both the signal transmission circuitry and the plurality of function buttons. Each of the plurality of function buttons corresponds to a control signal. The microprocessor is configured to, in response to a function button of the plurality of function buttons being activated, generate the control signal corresponding to the function button and cause the transmission circuitry to transmit the control signal. The remote control device has a password mode and when the password mode is enabled, the microprocessor is configured to receive a password entered using one or more of the plurality of function buttons, verify that the entered password is correct, and cause the transmission circuitry to transmit the control signal in response to the function button being activated only if the password is verified successfully.

As a feature of this aspect of the invention, the remote control device includes a memory storage device for storing the password. The password mode is enabled by storing the password in the memory storage device. As another feature, the password mode is enabled or disabled by toggling a password toggle.

As another feature, the microprocessor is configured to provide a password enable function for a user to enable or disable the password mode.

As a further feature, the microprocessor is configured to provide password programming function for receiving a new password from a user entered with the plurality of function buttons and for storing the new password in its memory storage device. The password programming function may be invoked by a pre-defined combination of function button activation, such as simultaneous activation of at least two function buttons, successive activations of one or more function buttons within a pre-defined time duration, pressing one or more function buttons continuously for a pre-defined minimum duration, or combinations thereof.

In password programming mode, the microprocessor may be configured to verify a user entered password against the password stored in the memory storage device and store a new password to replace the stored password only upon successful verification of the user entered password. The microprocessor may also be configured to disable its password mode if the new password fails to satisfy certain pre-defined criteria. As a further feature, an entry not satisfying the pre-defined criteria may be defined as a command and the microprocessor may be configured to erase the password from the memory storage device upon receiving a delete command and the password mode is disabled by erasing the password.

As another feature of the aspect of the invention, the remote control device has a device identification code stored in its memory storage device, and the microprocessor is configured to change the device identification code and erase the password from the memory storage device in response to a pre-defined combination of function button activation, such as simultaneous activation of at least two function buttons, successive activations of one or more function buttons within a pre-defined time duration, pressing one or more function buttons continuously for a pre-defined minimum duration, or combinations thereof.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION

Figure 1:
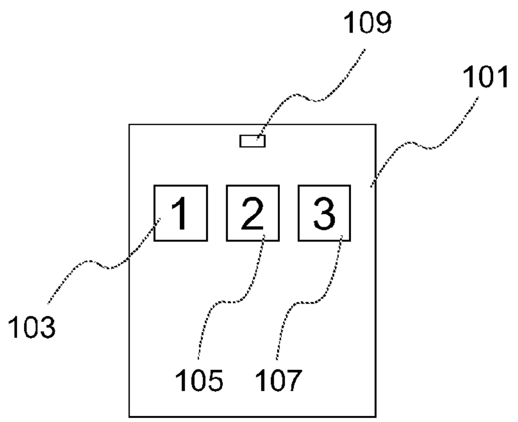
FIG. 1 is a diagram illustrating a remote control device having three function buttons.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

FIG. 1 is a diagram illustrating a three-button remote control device 101. Remote control device 101 has a housing with user interface that has three function buttons, 103, 105, 107. Each function button is assigned a different function. For instance, one assignment scheme may be opening door 1 with function button 103, opening door 2 with function button 105, opening door 3 with function button 107. Each function button may also be assigned or labeled with a digit. For example, the left button 103 may be labeled with digit "1", the middle button 105 labeled with digit "2" and the right button labeled with digit "3". Buttons 101, 103, 105 may be physical buttons on the housing, or may be virtual buttons provided on a GUI, such as an LCD display. Pressing any of these buttons will activate the remote control with the corresponding function. A display LED 109 is used for indicating status. When a GUI is provided, LED 109 may be replaced with a status window, or text display.

Figure 2:
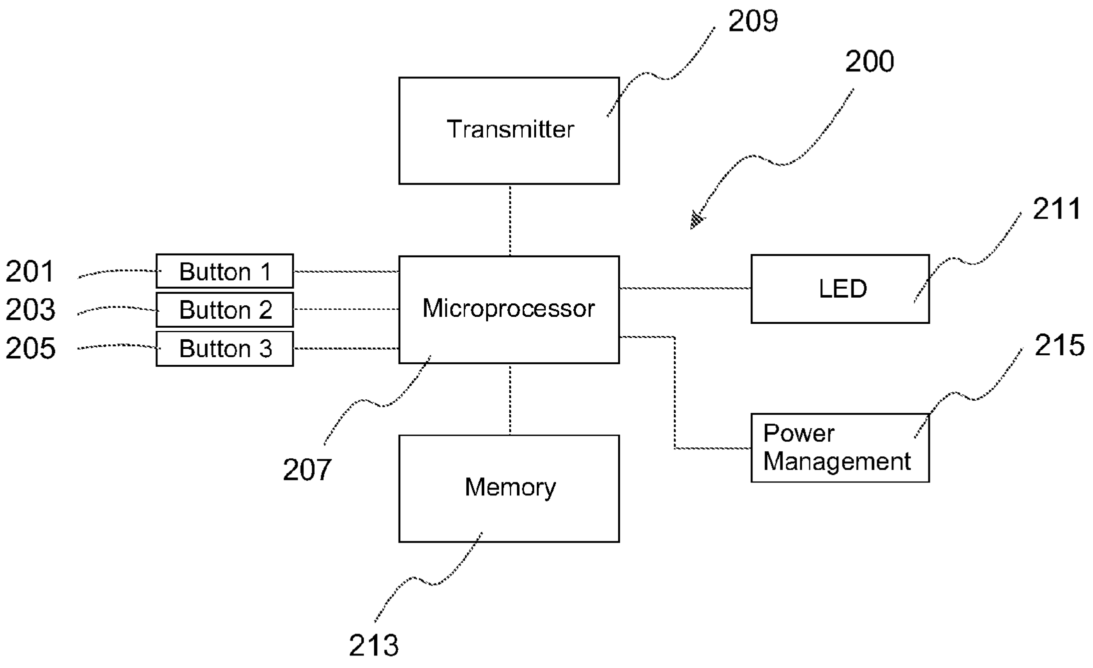
FIG. 2 is a block diagram of the remote control device shown in FIG. 1.

FIG. 2 illustrates in a block diagram a remote control device 200 that has multiple function buttons, such as buttons 201, 203, 205 as the input means. Each function button generally corresponds to a control function, which is assigned a control signal. Each control function may be a unique control function, in that no two function buttons are assigned the same control function. However, some duplication may also be possible if desirable. Pressing, i.e., activating, these function buttons causes the remote control device to send out different control signals associated with different control functions. A microprocessor 207 is operatively connected to or communicates with those buttons and can detect the activation of any of the function buttons. Microprocessor 207 is also operatively connected to signal transmission circuitry 209. When any one of these buttons is activated, a signal corresponding to the function button will be generated by the microprocessor and be transmitted by the transmission circuitry 209, which can be through infrared transmission, radio frequency transmission, or wired transmission. An LED 211 is usually used to indicate the signal being transmitted when a function button is being pressed. A memory storage device 213 can store variables such as a unique ID code of the remote control device, or user defined functions such as the function of each function button. Remote control 200 is usually battery operated. A power management circuitry 215, which usually includes a regulator, manages and regulates the operating voltage supplied by a battery or batteries. As will be appreciated, remote control 101 shown in FIG. 1 may be constructed according to the function block diagram shown in FIG. 2. Further, although FIGS. 1 and 2 each show only three function buttons, a remote control with more function buttons, e.g., ten function buttons, each assigned a digit from 0 to 9, may be similarly constructed.

As noted, it is desirable to add password functionality, which is often conventionally provided by adding additional password buttons. This would require additional hardware change. The inventors realize that password functions can also be provided by configuring the microprocessor to be responsive to pre-defined combinations of function button activation, without having to require additional password buttons. For example, a user may invoke a password programming function by entering a combination of key activation such as simultaneous pressing of several function buttons, quick succession of pressing (i.e., successive pressing within a short pre-defined time duration) of one or more function buttons, prolonged pressing (i.e., pressing and holding) of one or more function buttons and optionally coupled with pressing of other function button(s), among others, or combinations thereof. The microprocessor is configured to be responsive to such pre-defined combinations of key activation and will enter into different programming modes in response to different combinations, as will be described in detail below.

Figure 3:
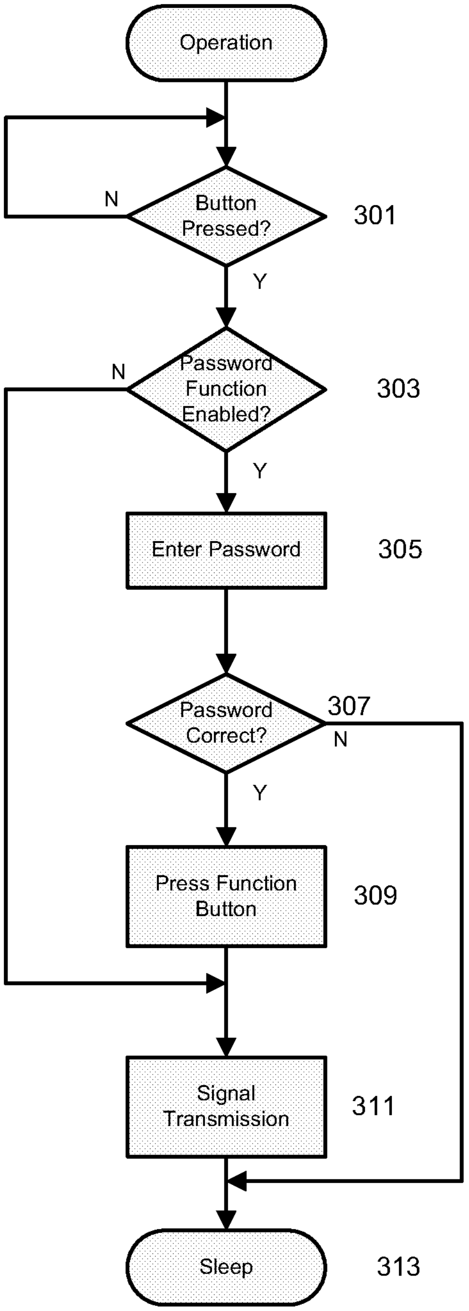
FIG. 3 is an operation flowchart for configuring a microprocessor of a remote control device and operating a configured (i.e., programmed) remote control device.

Firmware may be used to program, i.e., configure a microprocessor. Firmware can be stored in the memory storage device 213 and accessed or loaded by microprocessor 207 when needed. When so programmed, function buttons on the remote control can be used for password entry. A remote control device thus may be configured to have a password mode and have the password mode enabled. With the password mode enabled, before the remote control transmits any signal, a valid password must first be entered through the same buttons that will be used for signal transmission. FIG. 3 shows a flowchart of how this can be done.

When a remote control is not used, the microprocessor may be placed in sleep mode, which operates at a much slower clock speed in order to reduce current consumption and to extend battery life. At step 301, the microprocessor 207 detects whether there is any button activation. If a function button is pressed, the microprocessor will wake up, i.e., operate at a higher clock speed, such as rated clock speed. If there is no button activation, the microprocessor will continue to sleep until a button is pressed. When a function button is pressed, the microprocessor will determine at step 303 whether the remote control has its password mode enabled or disabled. A remote control device can have its password mode enabled by simply storing a password in the memory storage device and enabling this function, as will be described below. The microprocessor may also use a memory toggle, such as a register, to indicate whether it has the password mode enabled or disabled. A user can choose whether to enable or disable such password mode and the microprocessor is configured to let a user to control the enabling and disabling of password mode. How to enable or disable password mode will be described in detail later.

If the password mode is disabled, the remote control behaves like a traditional remote control. The microprocessor will treat the button pressed as a signal transmission command and jump to step 311 to transmit the corresponding signal. In other words, if password mode is not enabled, the remote control will send out signal immediately when a function button is pressed.

When the password mode is enabled, the microprocessor will expect the user to continue to enter a password at step 305. This can be done by entering a password with the function buttons 201, 203, 205 on the remote control. For example, if a password is 4 digits long and is "1231", the user will need to press function buttons 201, 203, 205 consecutively in the following order: button 201 corresponding to digit "1", button 203 corresponding to digit "2", button 205 corresponding to digit "3", and again button 201 corresponding to digit "1". Passwords can be stored in the memory device 213 (FIG. 2). The microprocessor next verifies that the user entered password is correct by comparing it against the password stored in the memory storage device (step 307). If the entered password is correct, the microprocessor proceeds to step 309 so a user can press a function button to send a corresponding signal with predefined function. At step 309, a user presses a function button, which is detected by the microprocessor. In response, the microprocessor causes a corresponding control signal to be sent (step 311) by the signal transmission circuitry 209. After signal transmission, the remote control goes back to sleep mode at step 313, and wait for the next activation. If the entered password is incorrect, the microprocessor will quit immediately and return to sleep mode.

Figure 4:
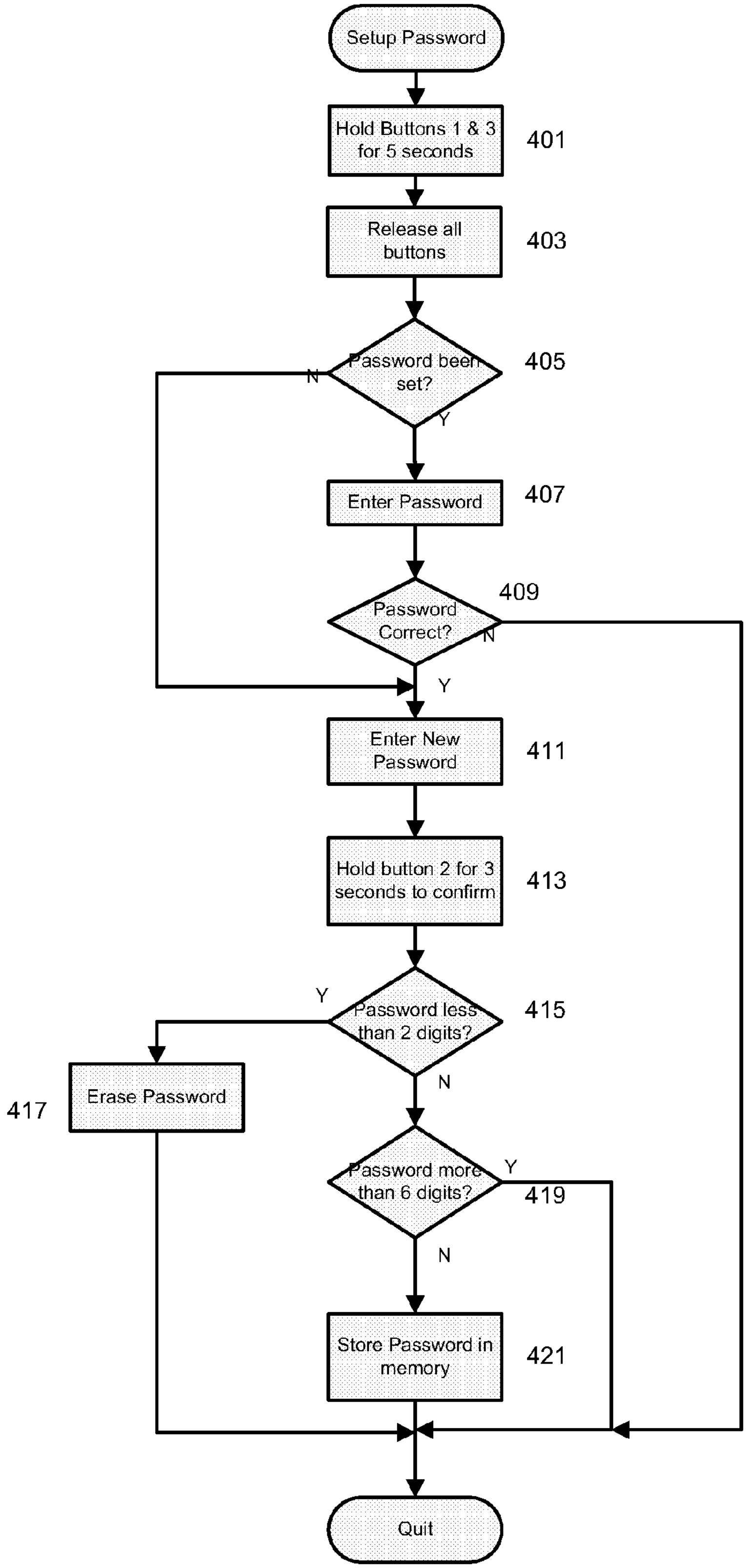
FIG. 4 is a flowchart illustrating a password programming process.

FIG. 4 illustrates how to set up a password. To invoke password programming function to setup or edit a password, a user first enters a pre-defined key activation combination. To illustrate this, consider an example of simultaneous and prolonged pressing of two function buttons as such a combination of key activation. A user presses and holds function buttons 201 and 203 simultaneously for at least 5 seconds (step 401). In response to this, the microprocessor is programmed to enter into password programming mode. A user next releases both buttons at step 403. At step 405, microprocessor checks its memory content or the memory storage device 213 to determine whether a password is currently set and stored. If no password is set, the microprocessor proceeds directly to step 411. A new password can now be entered by pressing the three function buttons on the remote control in a sequence corresponding to the new password. If a password is currently set, the current password will need to be entered correctly at step 407 first before the new password can be entered. The microprocessor verifies the user entered password (step 409) by comparing it against the stored password. If the user entered password is verified successfully, the microprocessor can then proceed to step 411 and a user can enter a new password as described above. If the current password is not entered correctly, i.e., if the verification fails, the remote control device will quit from password programming immediately. When a user finishes entering password, another combination of key activation can be used to indicate this. For example, a user can hold one function button, for example function button 203, for at least 3 seconds (step 413) after the last digit of the new password is entered.

As indicated earlier, each function button 201, 203, 205 can be assigned to a digit. The corresponding digit is entered each time a function button is pressed. A password therefore corresponds to a sequence of pressing of these function buttons. A password may be required to meet certain pre-defined criteria. For example, a password can have several digits, usually within a pre-defined range, for instance, maximum 6 digits and minimum 2 digits. If the entered password has more digits than the pre-defined maximum length, such as 6 digits, the microprocessor 207 at step 419 will not accept such entry and it will quit from password programming mode. If the entered password has less than 2 digits, in this case, only one digit, the entered password also will not be saved as a new password. In addition, the microprocessor can be programmed to treat a single digit entry in password programming mode as a command, as will be described in detail below. If the new password meets all requirements, it will be stored in the memory storage device 213 at step 421. Once saved, the new password must be entered correctly by a user next time at step 305 before the remote control device will accept further user input (step 309) as described earlier.

As described above, the microprocessor at step 415 may treat a single digit "password" as a command. This command may be designated as a delete command to erase the current password and the microprocessor will consequently erase the password from the memory storage device at step 417. Conveniently, when the password is erased, the password mode is disabled. Of course, a disable command can also be predefined, in response to which the microprocessor simply toggles an enable/disable register, without deleting the stored password. Thus, the microprocessor can be configured to be responsive to special commands that are special entries in password programming mode, which do not satisfy the predefined criteria, such as having a length outside the predefined range for valid passwords. In order to avoid accidental disabling of password mode due to mistakes in entering new password, such a delete command or disable command may be selected to satisfy additional requirements, in addition to being outside the pre-defined range. For example, a user may be allowed to enter a single digit "password" in password programming mode to disable the password mode but not a "password" with more than 6 digits for deleting a password. Alternatively, a password enable/disable function can be provided, invoking of which allows a user to enable or disable the password mode.

Figure 5:
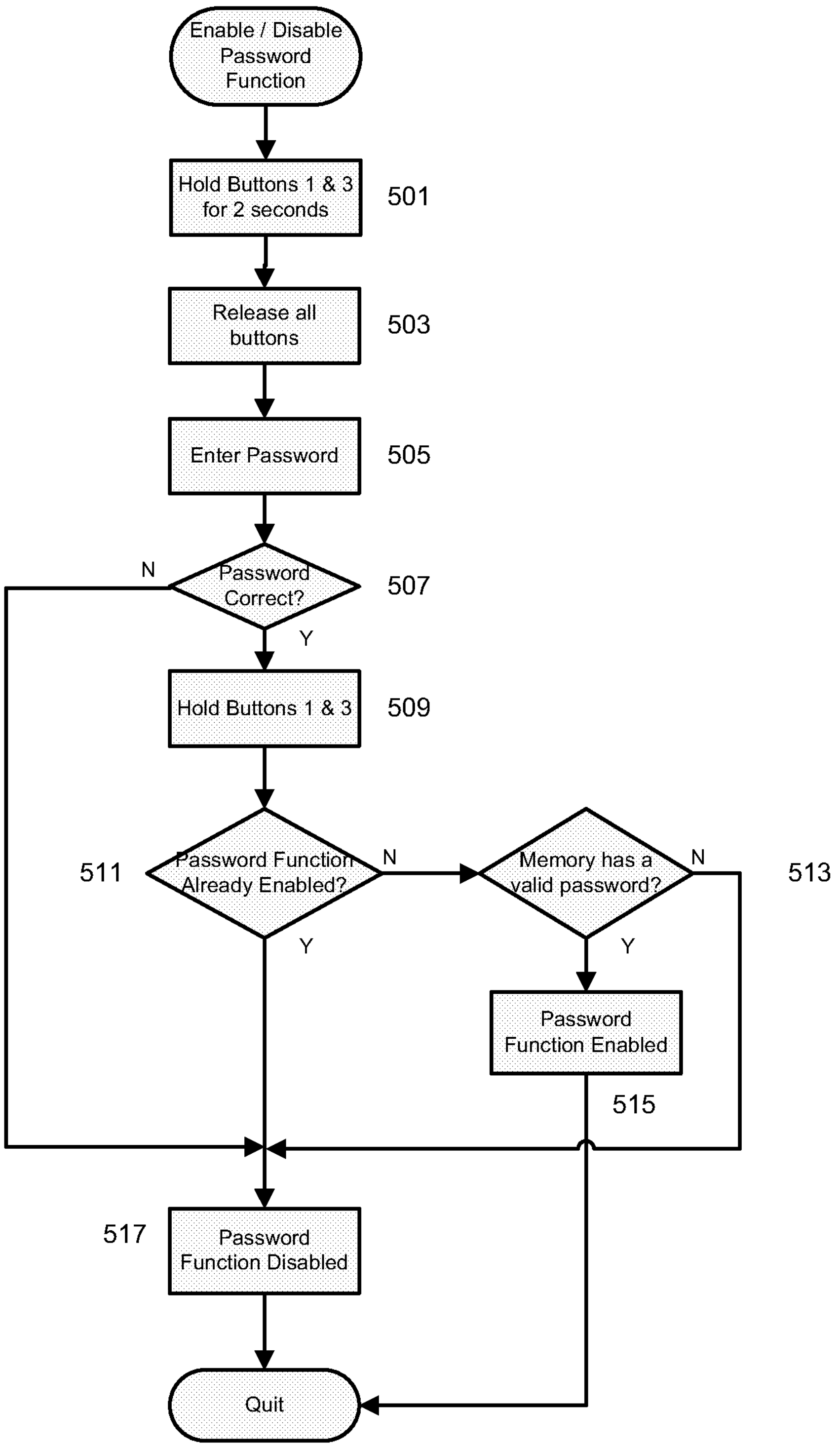
FIG. 5 is a flow chart illustrating a process to enable or disable the password mode.

FIG. 5 is an exemplary flowchart illustrating steps performed by such a password enable/disable function, i.e., a process executed by the microprocessor that is programmed to execute the steps according to the flowchart. To invoke the function, a user first holds both buttons 201 and 205 (representing buttons or digits 1 and 3) simultaneously for a brief period, such as two seconds (step 501). After that pre-selected period has passed, the user releases all buttons (step 503). The user is then required to enter a valid password using the function buttons (step 505). Once entered, the entered password is checked for its correctness (step 507). If the password entered is a valid and correct password, the user is required to hold buttons 201 and 205 simultaneously again for a brief period, such as two seconds (step 509). This will cause the microprocessor to check whether the password mode is already enabled, for example, by checking the content of the enable/disable register (step 511). If it is not enabled, the microprocessor is configured to next check whether its memory device contains a valid password (step 513). If a valid password is stored in the memory device, the microprocessor enables password mode (step 517) and exits from the password enable/disable function. If not, the microprocessor is configured to disable the password mode (step 517). Referring to FIG. 6 again, if the password entered at step 507 is not correct, the microprocessor is configured to disable the password mode at step 517 and then quit the password enable/disable function.

Figure 6:
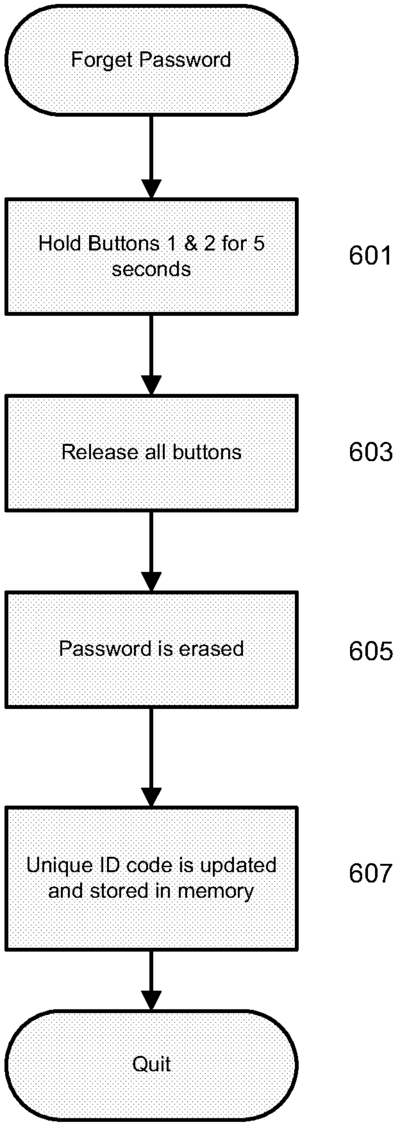
FIG. 6 is a flowchart illustrating a process to reset or erase a stored password without having to enter the stored password first.

The microprocessor is also configured to let a user to reset a password or to erase the password from the memory and also reset its device identification (ID) code at the same time. FIG. 6 is a flowchart illustrating a process executed by the microprocessor that is programmed to execute the steps according to the flowchart. The password is reset to its initial value (e.g., factory default) or simply erased, without having to first enter a valid password. This is useful in case a user forgets a password. A user is required to first invoke, i.e., cause the microprocessor to execute a "reset" routine. This can be done by requiring the user to enter a pre-defined combination of key activation which may be the same as or different from that required to invoke password programming function. For example, a user may be required to press and hold buttons 201 and 203 (i.e., buttons 1 and 2) for 5 seconds at step 601 to invoke the "reset" function. As soon as the two function buttons are released at step 603, the password is reset to its initial value or is erased (step 605). Alternatively, the microprocessor may be programmed to require further user input as confirmation before resetting or erasing the password at step 605. At the same time, the unique device ID code stored in the memory storage device will also be changed, or reset, at step 607. As a receiving device generally responds only to a remote control device whose unique device ID code is recognized by the receiving device, this means that the receiving device will no longer respond to the remote control device as it now has a different device ID code. In other words, the remote control can no longer control the receiving device. To re-program the remote control to control the receiving device, the microprocessor may require a user to have physical access to the receiving device. For example, the microprocessor may require receiving an acknowledgment signal from the receiving device or having a direct wired connection between the remote control device and the receiving device before it will proceed further to re-program the remote control device. If this is a remote control for a garage door opener, for example, the original garage door opener will not recognize this remote control with a new device ID code. Therefore, even if a lost remote control is found by a stranger and the stranger tries to reset or erase the password, access to the receiving device would still be denied. On the other hand, if a user has physical access to the receiving device, the user can re-program the remote control for the receiving device. After being re-programmed, a new device ID code of the remote control will be generated. The new device ID code will be stored in memory devices of both the remote control and the receiving device, thus allowing control of the receiving device by the re-programmed remote control again.

Various examples of the invention have now been described in detail. Those skilled in the art will appreciate that numerous modifications, adaptations and variations may be made to the examples without departing from the scope of the invention. Since changes in and/or additions to the above-described best mode may be made without departing from the scope of the invention, the invention is not to be limited to those details but only by the appended claims.

What is claimed is:

1. A remote control device for controlling a plurality of controlled devices comprising:

a plurality of function buttons, each of the plurality of function buttons corresponding to a control signal recognized by only one of the plurality of controlled devices;

a signal transmission circuitry; and a microprocessor operatively connected to both the signal transmission circuitry and the plurality of function buttons, the microprocessor being configured to, in response to a function button of the plurality of function buttons being activated, generate the control signal corresponding to the function button of the plurality of function buttons being activated and cause the transmission circuitry to transmit the control signal, wherein the remote control device has a password mode and when the password mode is enabled, the microprocessor is configured to:

receive a password entered using at least two function buttons of the plurality of function buttons, wherein one of two of the at least two function buttons of the plurality of function buttons is assigned to control a first controlled device of the plurality of controlled devices while the other of the two of the at least two function buttons of the plurality of function buttons is assigned to control a second, different controlled device of the plurality of controlled devices, verify that the entered password is correct, and cause the transmission circuitry to transmit the control signal in response to the function button of the plurality of function buttons being activated only after the entered password is verified successfully.

2. The remote control device of claim 1, wherein the password corresponds to a pre-selected sequence of activation of the at least two function buttons of the plurality of function buttons.

3. The remote control device of claim 1, further comprising a password mode toggle, wherein the password mode is enabled or disabled by toggling the password mode toggle.

4. The remote control device of claim 1, wherein the microprocessor is configured to provide a password enable function for a user to enable or disable the password mode.

5. The remote control device of claim 4, wherein the microprocessor is configured to verify that the entered password is correct before disabling the password mode.

6. The remote control device of claim 4, wherein a pre-defined combination of function button activation of the plurality of function buttons is required by at least one of:

invoking the password enable function, enabling the password mode, and disabling the password mode.

7. The remote control device of claim 1, further comprising a memory storage device, the password being stored in the memory storage device.

8. The remote control device of claim 7, wherein the password mode is enabled by storing the password in the memory storage device.

9. The remote control device of claim 8, wherein the microprocessor determines whether the password mode is enabled by checking whether the memory storage device has the password stored therein.

10. The remote control device of claim 7, wherein the remote control device has a device identification code stored in the memory storage device, and the microprocessor is configured to change the device identification code and the password in response to a pre-defined combination of function button activation of the plurality of function buttons.

11. The remote control device of claim 10, wherein the pre-defined combination of function button activation of the plurality of function buttons comprises simultaneous activation of at least two function buttons of the plurality of function buttons, successive activations of one or more function buttons of the plurality of function buttons within a pre-defined time duration, pressing one or more function buttons of the plurality of function buttons continuously for a pre-defined minimum duration, or combinations thereof.

12. The remote control device of claim 10, wherein the microprocessor is configured to change the device identification code and the password without requiring a stored password being first entered.

13. The remote control device of claim 7, wherein the microprocessor is configured to provide a password programming function for receiving a new password from a user entered using at least two function buttons of the plurality of function buttons, each one of two of the at least two function buttons of the plurality of function buttons being assigned to control a different controlled device from the plurality of controlled devices, and for storing the new password in the memory storage device.

14. The remote control device of claim 13, wherein the password programming function is invoked by a pre-defined combination of function button activation of the plurality of function buttons.

15. The remote control device of claim 14, wherein the pre-defined combination of function button activation of the plurality of function buttons comprises simultaneous activation of at least two function buttons of the plurality of function buttons, successive activations of one or more function buttons of the plurality of function buttons within a pre-defined time duration, pressing one or more function buttons of the plurality of function buttons continuously for a pre-defined minimum duration, or combinations thereof.

16. The remote control device of claim 13, wherein the microprocessor verifies that the new password satisfies pre-defined criteria and stores the new password only upon successful verification.

17. The remote control device of claim 16, wherein the microprocessor is configured to disable the password mode if the new password fails to satisfy the pre-defined criteria.

18. The remote control device of claim 16, wherein the microprocessor is configured to erase the password from the memory storage device upon receiving a delete command from a user, and the password mode is disabled by erasing the password, the delete command being selected from function button entry not satisfying the pre-defined criteria.

19. The remote control device of claim 16, wherein the verification includes verifying that the length of the new password is within a pre-defined range.

20. The remote control device of claim 19, wherein the microprocessor is configured to disable the password mode if the length of the new password is less than a minimum of the pre-defined range.

* * * * *